Figures 3, 4:
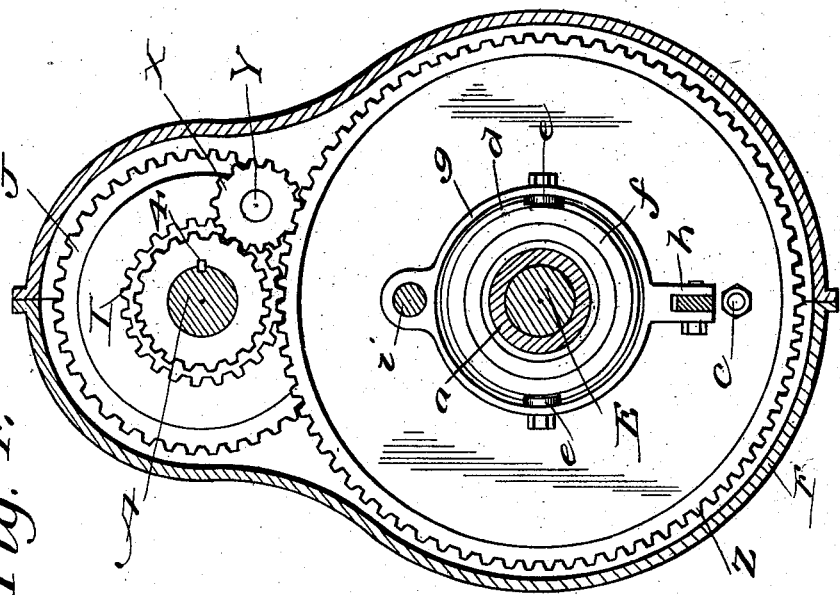

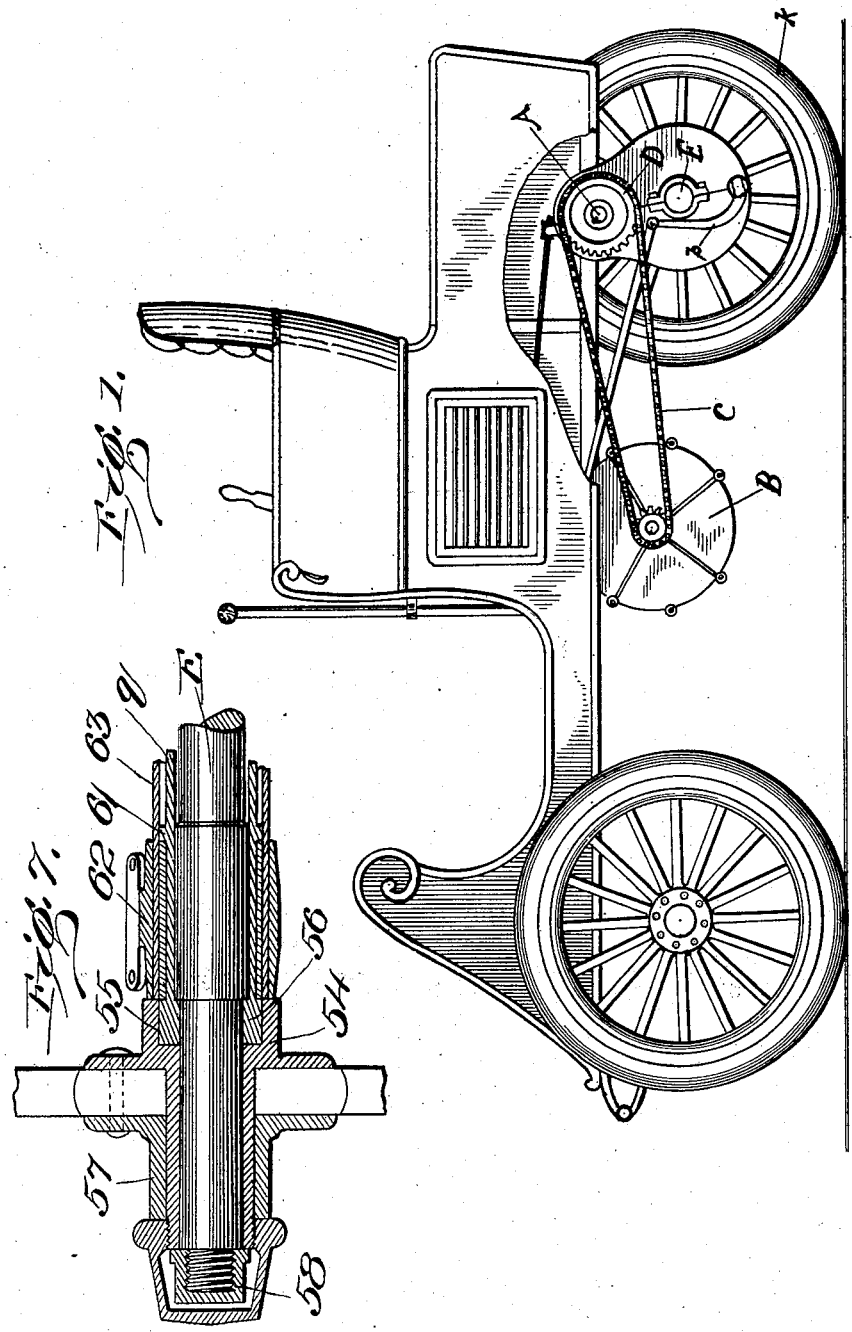

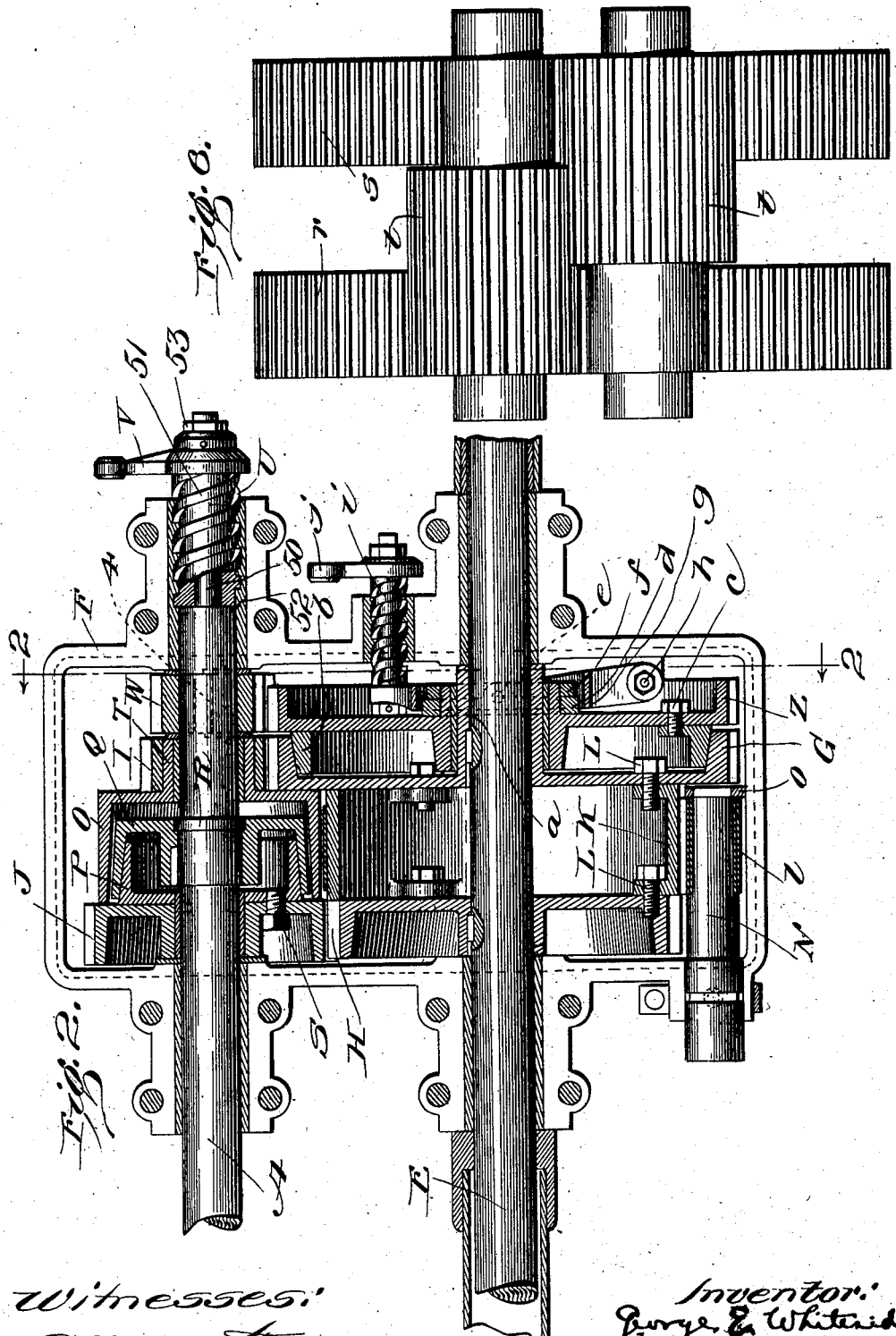

No. 746,216. PATENTED DEC. 8, 1903.
G. E. WHITESIDE.
POWER TRANSMISSION GEARING.
APPLICATION FILED NOV. 17, 1902.
NO MODEL. 4 SHEETS—SHEET 3.

WITNESSES: INVENTOR

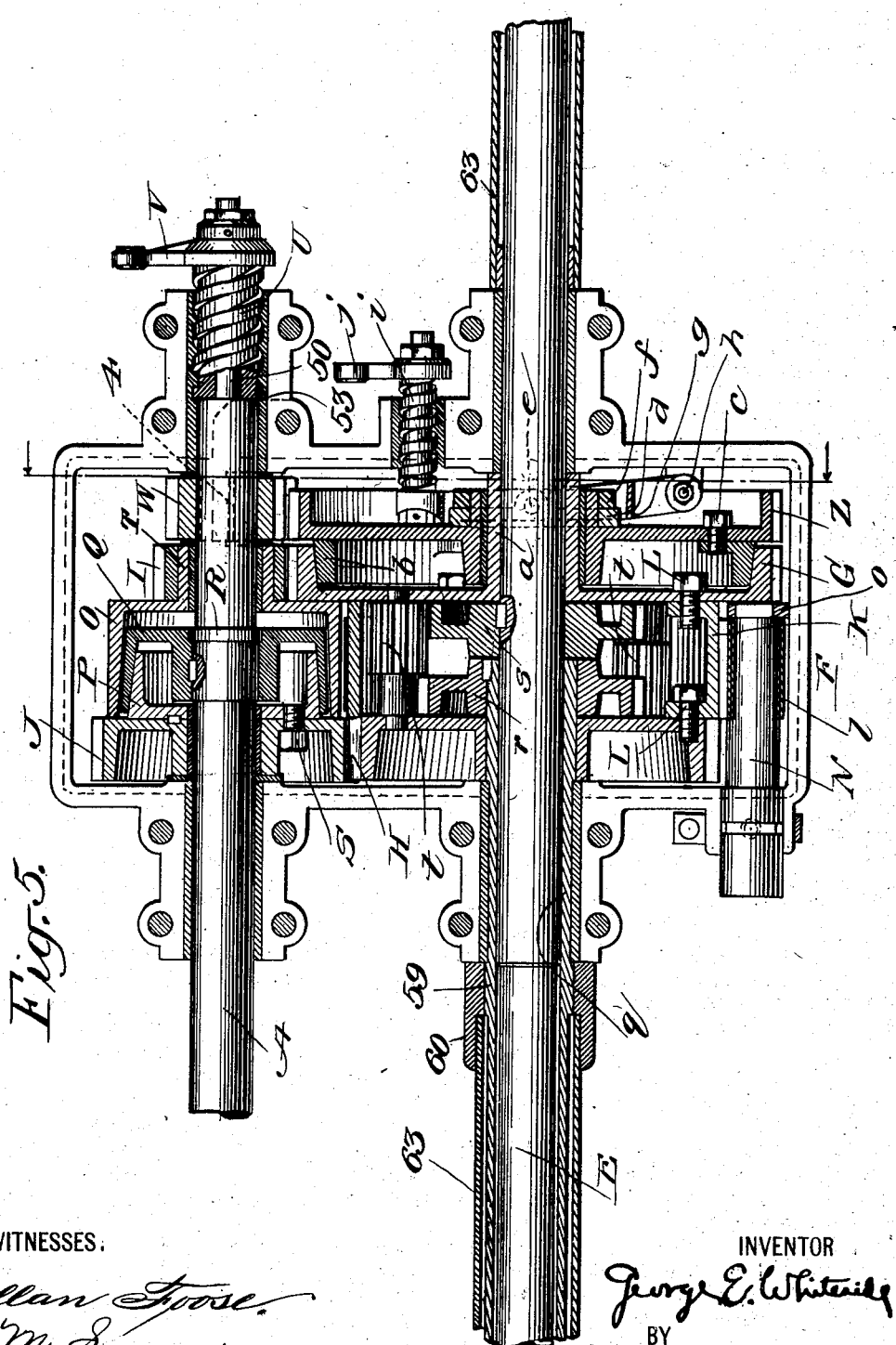

No. 746,216. Patented December 8, 1903.

UNITED STATES PATENT OFFICE.

GEORGE E. WHITESIDE, OF WILSON, NEW YORK, ASSIGNOR TO HARRY HIGHLAND, OF NIAGARA FALLS, NEW YORK.

POWER-TRANSMISSION GEARING.

SPECIFICATION forming part of Letters Patent No. 746,216, dated December 8, 1903.

Application filed November 17, 1902. Serial No. 131,602. (No model.)

*To all whom it may concern:*

Be it known that I, GEORGE E. WHITESIDE, residing at Wilson, in the county of Niagara and State of New York, have invented certain new and useful Improvements in Power-Transmission Gearing for Automobiles, &c., of which the following is a full, clear, and exact description, such as will enable others skilled in the art to which it appertains to make and use the same.

My invention relates to power-transmission gearing for automobiles and other uses; and the objects of my invention are to improve upon the construction and increase the efficiency of power-transmission gearing with simplicity of parts and certainty of operation.

Further objects of my invention will hereinafter appear; and to these ends my invention consists in the features of construction, combinations of elements, and arrangement of parts having the general mode of operation substantially as hereinafter fully described and claimed in this specification and shown in the accompanying drawings, in which—

Figure 1 is a side elevation of an automobile provided with my improved transmission-gearing. Fig. 2 is a longitudinal sectional elevation of power-transmission gearing embodying one form of my invention. Fig. 3 is a top plan view of the gearing with part of the gear-case in section. Fig. 4 is a sectional end elevation of the gearing on the line 2 2 of Fig. 2. Fig. 5 is a longitudinal sectional elevation of a modified form of transmission-gearing embodying differential gears. Fig. 6 is an enlarged detail plan view of the differential gears, and Fig. 7 is a detail sectional view of the hub of a wheel and journal.

According to my invention the driving-shaft or counter-shaft A may be driven by any suitable means, shown in this instance as an engine B, connected to drive the shaft A by means of the chain C and sprocket D, and means are provided for operating the driven shaft or axle E at different rates of speed and for reversing the rotation of said shaft without varying the speed or direction of rotation of the driving-shaft A.

The mechanism for transmitting power from the driving-shaft to the driven shaft is shown within the gear-case F, and comprises, essentially, variable-speed and reversing connections, shown in this instance as intermeshing gearing, with clutches connected to control the operation of the same.

In the form of gearing shown in Fig. 2 gears G and H are shown fast upon the shaft or axle E, the larger gear G meshing with a pinion I, rotatable upon the driving-shaft A, while the smaller gear H meshes with a pinion J, also loose or rotatable upon the shaft A. The gears H and G are shown in this instance connected to each other by means of an annular flanged ring K, which may be secured to each gear, as by means of the bolts L, the drum thus formed being suitable for the application of a brake-strap, hereinafter to be described. According to my construction the pinions I and J are provided with clutch members O and P, with which a clutch member Q, connected to the shaft A, is adapted to coöperate when moved in either direction longitudinally of the shaft A, the centrally-disposed clutch member Q being shown in this instance as held in position on the shaft A by any suitable means, as a collar R and key. The clutch members referred to may be of any suitable construction and arrangement; but in the construction shown the member P consists of a flanged and tapering ring secured to the pinion J, as by means of the threaded screws S, and forming a male clutch member adapted to coöperate with the concentric female member Q. The pinion I is fast upon the hub T of the clutch member O, said clutch member O being loose upon the shaft A and concentric with the member Q, forming a female clutch member therefor. From the construction described it will be seen that when longitudinal movement is imparted to the central clutch member Q by any suitable means coöperation may be obtained, as desired, with either of the members O and P, thereby transmitting motion to either one of the gears G and H for driving the shaft E at slow or fast speed or at different rates of speed, as desired. Means are provided for preventing both inner and outer clutch members O and P from engaging the central clutch member Q at the same time, as shown in this instance, the end of the outer clutch member O being in contact with the side of the pinion J, but not secured thereto, and the arrangements of parts is such that when the member Q is moved into frictional engagement with the outer member O there will be no frictional contact with the member P, and when the member Q is moved into frictional engagement with the member P it is disengaged from the member O. The member O in this instance will be prevented from moving longitudinally of the shaft because of the abutment against the pinion J. Suitable means are provided for moving the shaft A longitudinally in its bearings in the gear-case, while permitting it to rotate freely, as shown, the shaft being provided with a reduced end 50, over which an outwardly-screw-threaded sleeve 51 is loosely arranged. The inside of the gear-case is screw-threaded to coöperate with the sleeve 51, which, as shown, abuts against the shoulder 52 on the shaft A, so that rotation of the sleeve 51 in one direction will move the shaft longitudinally in its bearings. An arm V is attached to the sleeve 51, and a nut 53 secures the sleeve in position on the reduced portion of the shaft to permit rotation of the shaft within the sleeve. The arm V may be connected in any suitable manner with devices in the automobile, whereby said arm may be rocked to cause longitudinal movement of the shaft A in either direction. According to my construction means are provided for causing reverse rotation of the driven shaft E, as shown, there being a pinion W connected to rotate with the shaft A and secured thereto by a sliding key 4, fast to the shaft, and the pinion is provided with a keyway in which the key slides. Meshing with the pinion W is a pinion X, mounted loosely on a stud Y, fixed to the gear-case F, and a gear Z, loosely mounted upon the hub $a$ of the gear G, meshes with the pinion X. The gear Z is provided with a projecting clutch member $b$, in the form of a tapering annular ring secured to the gear Z by suitable means, shown as the bolts $c$. The clutch member $b$ is adapted to coöperate with a clutch member on the gear G to engage the same and drive said gear in a reverse direction from that in which it is driven by the pinion I. As shown in the drawings, the gear G forms a female clutch member for the male clutch member $b$, fast to the gear Z, and suitable means are provided for moving said gear Z and member $b$ longitudinally of the hub $a$. Upon the hub of the gear Z is loosely mounted a ring $d$, provided with lugs $e$, arranged opposite each other, the ring being held in place by another ring $f$, fixed to the outer portion of the hub of the gear Z, so that a running groove is formed for the ring $d$. A spanner-ring $g$ is provided with a fork at one side, fastened, as by means of a hinge $h$, to the gear-case inside the same, said spanner-ring being pivotally secured to the lugs $e$. The outer end of the spanner-ring $g$ is provided with an eye to receive the end of a threaded shifter $i$, having an arm $j$, this shifter being substantially similar to the shifter U. By rocking the arm $j$ the spanner-ring $g$ will move the ring $d$ and clutch member $b$ longitudinally upon the hub $a$ to engage and disengage said clutch member with the gear G. The wheels $k$ of the automobile, illustrated in connection with my invention, are secured to rotate with the driven shaft E in the construction illustrated in Fig. 2, and it will be seen that both wheels will be driven when either of the gears G or H is driven. The brake-band $l$ encircles the drum or ring K, and its ends are secured to flat sides on the brake-shaft N, supported in a socket $o$ within the gear-case. On the outer end of the brake-shaft N is fixed an arm $p$, Fig. 1, for rotating the shaft, and thereby folding the brake-band around the same to produce friction or binding upon the brake-drum to act as a brake for the vehicle. The brake-arm $p$ may be suitably connected to a lever in the vehicle, whereby the same will be operated.

In the modified form of gearing shown in Fig. 5 a differential or compensating gear is shown in conjunction therewith, and in this instance one portion of the shaft E is provided with a sleeve $p$, as shown, the sleeve extending to substantially the middle of the shaft and terminating between the gears G and H, which gears in this instance are loose upon the shaft and sleeve, respectively. The gears $r$ and $s$ are secured to the inner projecting portion of the sleeve $p$ and to the driven shaft, as by means of keys, while pairs of compensating pinions $t$ are journaled, as shown, in the sides of the gears G and H, and provided with teeth upon a portion only of each, as shown in this instance, the teeth on the pinions $t$ covering, substantially, two-thirds of the length of each pinion, the remainder of said pinions being reduced and unprovided with teeth. The pairs of pinions $t$ mesh with with each other, and each pinion $t$ meshes with one of the gears $r$ and $s$, so that when said pinions $t$ are carried around by the gears G and H a lock between them will be formed, and the shaft E and sleeve $q$ will be rotated simultaneously. There may be any desired number of pairs of pinions $t$ spaced about the gears $r$ and $s$, and according to this construction it will be seen that the shaft E and sleeve $q$ may be rotated in opposite directions, as well as in the same direction, and one may rotate at a different rate of speed than the other, either forward or backward.

Referring to Fig. 1, it will be seen that according to my construction the driving-shaft or counter-shaft A is arranged substantially between the driven shaft or axle E and the engine B and above the same, suitable connections being provided between the engine and the driving-shaft A for driving the parts. This construction has been found to be efficient and strong and operates satisfactorily and well. From the inner left side of the gear-case to the outer left side of the gear-case the sleeve $q$ is reduced to a lesser diameter to resist end thrust resulting from the wheels of the carriage and to confine the sleeve to its bearing in the gear-case. Then for a portion of its length the outside diameter of the sleeve is increased, as at 59, and over this portion a collar 60 is loosely mounted. The sleeve is also reduced in its outside diameter for the main portion of its length, the diameter being increased at 61, Fig. 7, to a size corresponding with the diameter within the gear-case for a short distance, forming a collar, and near its outer extremity it is reduced for the bearing of the spring-block 62, and at the extreme end it is provided with a hexagonal or octagonal head 56, hereinafter referred to. Covering all exposed portions of the sleeve $q$ on the left and the axle E on the right are seamless tubes 63. The tube over the sleeve $q$ is thrust into the collar 60 on its inner end and fixed into the spring-block 62 at it outer end.

Referring to Fig. 7, the hub of a wheel is shown in longitudinal section as adapted more particularly for use in connection with the sleeve $q$ when the differential gears are used. The hub 54 of the wheel is constructed of substantially the form shown in Fig. 7 and at its inside face is provided with an opening 55 of hexagonal or octagonal shape of the desired depth. The sleeve $q$ is provided with a head 56, adapted to fit within the opening 55, while a band 57, of suitable metal, is shrunk upon the hub 54 outside of that portion of the hub, having the opening 55 to add strength and prevent splitting of the hub. The hub is held in place by a suitable nut on the end of the axle in the usual manner to allow the wheel to be removed at will. The right hub on that portion of the axle where there is no sleeve is similar in construction to the hub described, except that a keyway is cut in the inner box at the inside end of sufficient length to hold the hub securely to the axle by means of the key. The hubs for the front wheels of the vehicle are of similar construction, excepting that no keyways or hexagonal or octagonal recesses are provided in them.

With the arrangement of clutches described for driving at different speeds I am enabled to do away with one clutch member heretofore used, carrying out the objects in view with a central clutch member and coöperating members disposed at each side of the same. By constructing the shaft E entirely of one piece extending transversely of the apparatus and providing a sleeve upon one portion of the shaft a rigid construction is secured for the operation of the transmission and differential gearing. It will also be seen that according to my invention the variable-speed connections between the counter-shaft and driven shaft are provided with a clutch member, shown as embodied in one of the gears, and another clutch member, slidable upon the hub of said gear, is adapted to coöperate therewith and is connected to control the reversing connections. The clutch member provided for the reversing connections is independent of the clutch mechanism connected to control the variable-speed connections.

Obviously some features of my invention may be used without others, and my invention may be embodied in widely-varying forms.

Therefore, without limiting myself to the construction shown and described nor enumerating equivalents, I claim, and desire to obtain by Letters Patent, the following:

1. In a power-transmission gearing, the combination of a longitudinally-movable counter-shaft, a driven shaft, operative connections between the same, a plurality of concentric clutch members connected to control said connections, one of said members being connected to rotate with the counter-shaft and move longitudinally therewith, and means for moving said shaft longitudinally to engage and disengage the said clutch members.

2. In a power-transmission gearing, the combination of a longitudinally-movable counter-shaft, a driven shaft, variable-speed connections between said shafts, a central clutch member connected to the counter-shaft, inner and outer concentric clutch members adapted to coöperate with said clutch member and connected to operate the variable-speed connections, and means for moving said counter-shaft longitudinally to carry the central clutch member into and out of engagement with the inner and outer clutch members.

3. In a power-transmission gearing, the combination with the gear-case, of a longitudinally-movable counter-shaft supported in suitable bearings, an outwardly screw-threaded sleeve on one end of said shaft adapted to an inwardly-screw-threaded portion of the gear-case, a driven shaft, variable-speed connections between said shafts, a central clutch member connected to the counter-shaft, inner and outer concentric clutch members adapted to coöperate with the central clutch member and connected to operate the high and low speed connections, and means for rotating said outwardly-screw-threaded sleeve whereby longitudinal movement is imparted to the counter-shaft to operate said clutches.

4. In a power-transmission gearing, the combination of a counter-shaft and gears loosely connected thereto, a driven shaft and gears connected thereto to drive the same, annular concentric clutch members connected to the gears on the counter-shaft, a centrally-disposed clutch member concentric with said annular clutch members and connected to move with the driving-shaft and adapted to be moved into and out of engagement with said annular clutch members, and means for moving said centrally-disposed clutch member.

5. In a power-transmission gearing, the combination with the gear-case, of a driven shaft, a counter-shaft, a screw-threaded sleeve on the counter-shaft, bearings for said shafts, a portion of the gear-case being inwardly screw-threaded and adapted to the threaded sleeve, operative connections between the shafts, clutch mechanism controlling the operation of said connections, and means for rocking said sleeve to move the counter-shaft longitudinally and operate the said clutch mechanism.

6. In a power-transmission gearing, the combination of a counter-shaft, a driven shaft, variable-speed and reversing connections between said shafts, clutch mechanism connected to control the variable-speed connections, said variable-speed connections being provided with a clutch member, another clutch member adapted to coöperate therewith and connected to control the reversing connections, and means for moving said last-named clutch member.

7. In a power-transmission gearing, the combination of a counter-shaft, a driven shaft, variable-speed and reversing connections between said shafts, clutch mechanism for controlling said variable-speed connections, and means for actuating said mechanism, said variable-speed connections being provided with a clutch member independent of the clutch mechanism for controlling said variable-speed connections, and another clutch member movable into and out of engagement with said last-named clutch member and connected to reverse the rotation of the driven shaft.

8. In a power-transmission gearing, the combination of a counter-shaft, a driven shaft, variable-speed and reversing connections between the shafts, clutch mechanism connected to control said reversing connections, one of the clutch members of said mechanism being longitudinally movable, and means connected to move said member comprising a threaded rod adapted to an inwardly-screw-threaded bearing with means for rocking said rod in its bearing.

9. In a power-transmission gearing, the combination of a counter-shaft, a driven shaft, a sleeve loose upon the driven shaft and extending over a portion of the same, intermeshing variable-speed gears loose upon the counter-shaft and driven shaft and sleeve, a drum connecting said gears on the driven shaft and sleeve, and differential gearing comprising gears arranged within the drum fast upon the driven shaft and sleeve, and pairs of pinions journaled within the drum, the pinions of each pair meshing with each other and each meshing with one of the gears within the drum.

10. The combination with the gear-case, of a counter-shaft and axle extending through the same, a loose sleeve upon a portion of said axle and extending into the gear-case, the wheels connected to said axle and sleeve respectively, means for operatively connecting the counter-shaft with the axle and sleeve, said sleeve being provided with a reduced portion into which the gear-case fits, whereby the sleeve is confined to its bearing and end thrust resulting from the wheels is prevented.

11. The combination with the gear-case, of a counter-shaft and axle extending through the same, a loose sleeve upon a portion of said axle and extending into the gear-case, wheels connected to the axle and sleeve respectively, said sleeve being provided with means for confining it to its bearing and preventing end thrust from the wheels, and means for operatively connecting the counter-shaft with the axle and sleeve.

12. The combination with the gear-case, of a counter-shaft and axle extending through the same, a loose sleeve upon a portion of said axle and extending into the gear-case, wheels connected to the axle and sleeve respectively, said sleeve being formed with a reduced diameter for the main portion of its length and reduced portions at its ends separated from the main portion by collars, and means for operatively connecting the counter-shaft with the axle and sleeve.

13. The combination with the gear-case, of a counter-shaft and axle extending through the same, a loose sleeve upon a portion of said axle and extending into the gear-case, wheels connected to the axle and sleeve respectively, said sleeve being provided at its inner end with means for confining the sleeve to its bearing in the gear-case and for preventing end thrust from the wheels, and provided at its outer end with an angular portion adapted to the recessed hub of the wheel, and means for operatively connecting the counter-shaft with the axle and sleeve.

14. The combination with the gear-case, of a counter-shaft and axle extending through the same, a loose sleeve upon a portion of said axle and extending into the gear-case, wheels connected to the axle and sleeve respectively, said sleeve being provided at its inner end with means for confining the sleeve to its bearing in the gear-case and for preventing end thrust from the wheels, and provided at its outer end with an angular portion adapted to the recessed hub of the wheel, and a seamless tube covering all exposed portions of said sleeve, and means for operatively connecting the counter-shaft with the axle and sleeve.

15. In a power-transmission gearing, the combination of a counter-shaft, a driven shaft, operative connections between the same, a plurality of concentric rotary clutch members connected to control said connections, one of said members being arranged centrally between two of the others, and means for moving said centrally-arranged clutch member into and out of engagement with each of the other members.

16. In a power-transmission gearing, the combination of a counter-shaft, a driven shaft, variable-speed gearing adapted to be thrown into operative connection with said shafts to operate the driven shaft at different speeds, a centrally-disposed clutch member connected to rotate with the counter-shaft, inner and outer concentric rotary clutch members adapted to coöperate with the central clutch member and connected to operate the variable-speed connections, and means for moving said centrally-disposed clutch member into and out of engagement with said inner and outer clutch members.

17. The combination with the gear-case, of a counter-shaft and axle extending through the same, a loose sleeve upon a portion of said axle, wheels connected to the axle and sleeve respectively, said sleeve being provided with means whereby it is confined to its bearing and end thrusts from the wheels are prevented, and means for operatively connecting the counter-shaft with the axle and sleeve.

In testimony whereof I affix my signature in the presence of two witnesses.

GEORGE E. WHITESIDE.

Witnesses:
H. M. SEAMANS,
I. C. DELANEY.